UNITED STATES PATENT OFFICE.

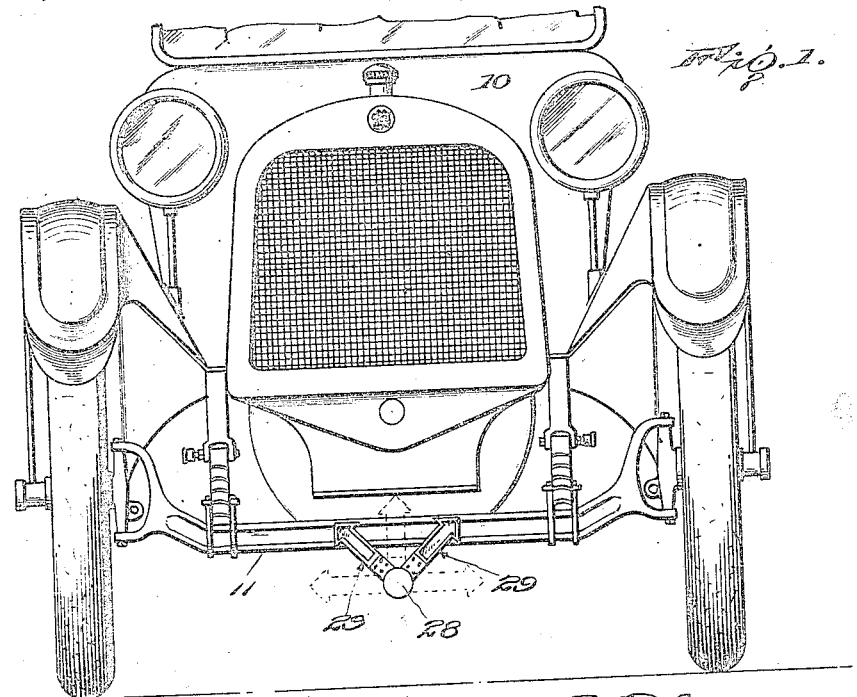
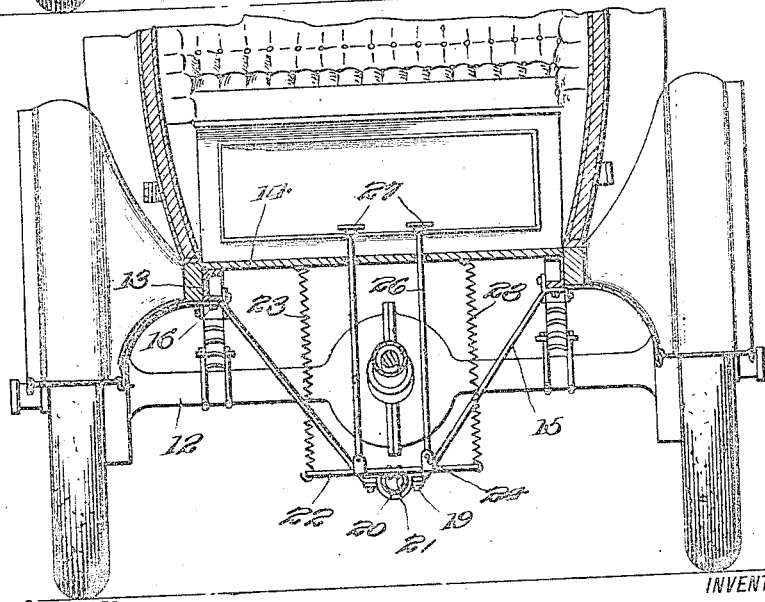

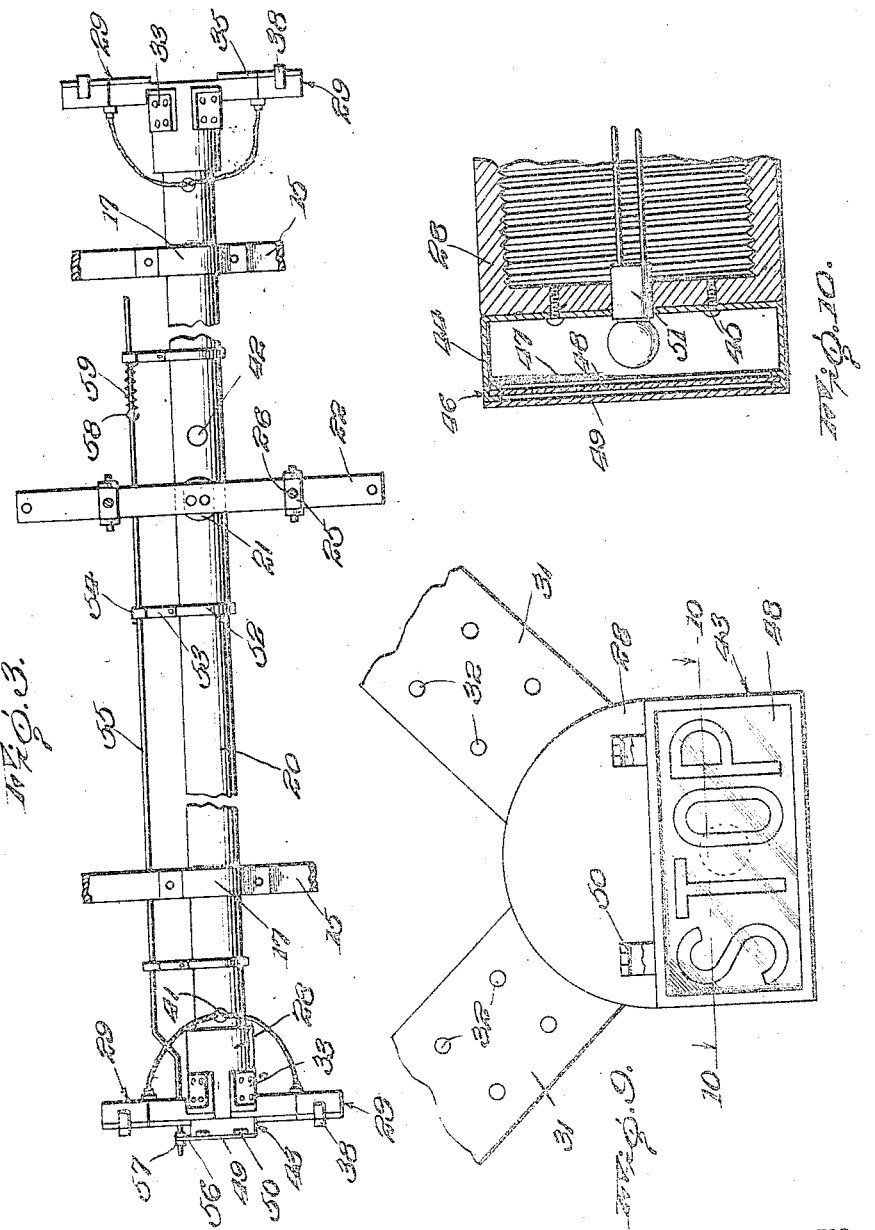

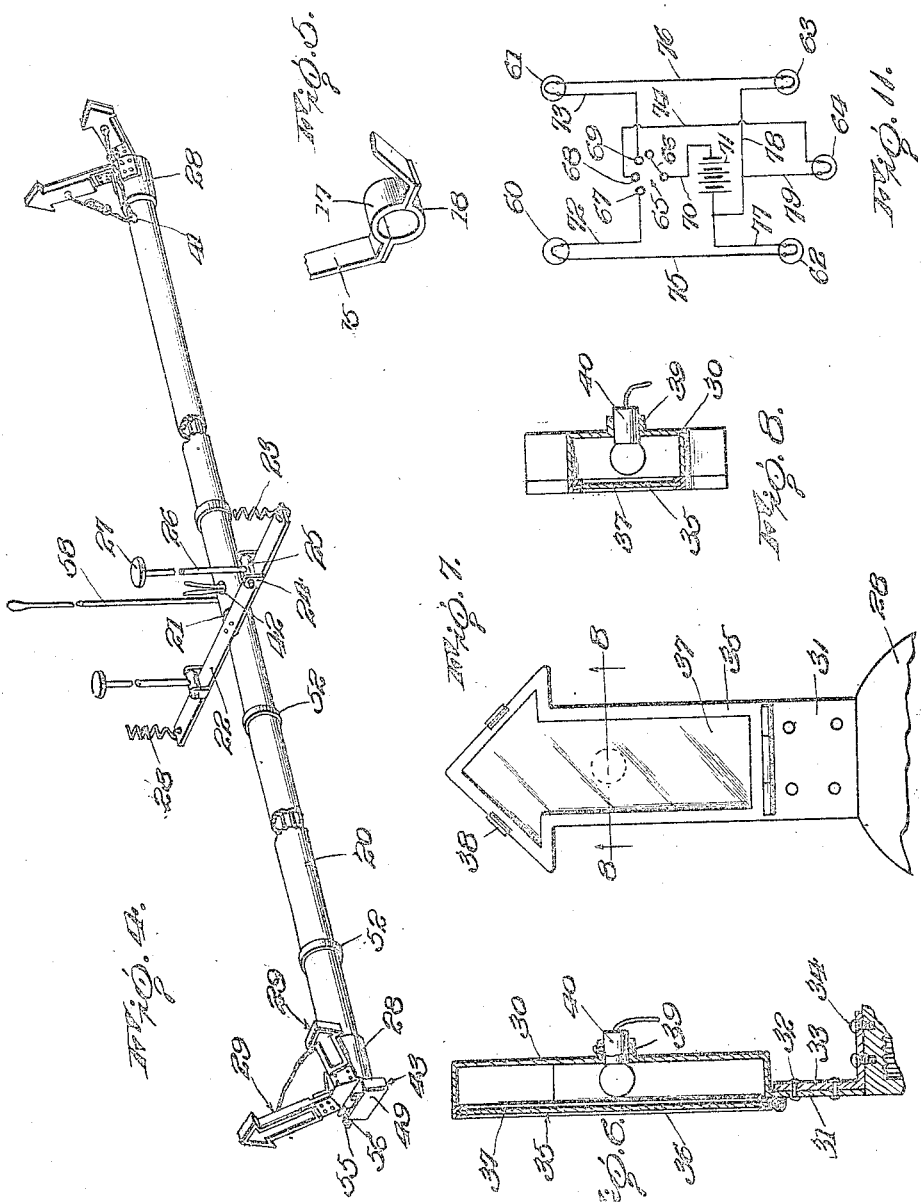

WILLIAM J. ROSE, OF NEW LONDON, CONNECTICUT.

AUTOMOBILE-SIGNAL.

1,289,919.  Specification of Letters Patent.  Patented Dec. 31, 1918.

Application filed August 2, 1917. Serial No. 184,102.

*To all whom it may concern:*

Be it known that I, WILLIAM J. ROSE, a citizen of the United States, residing at New London, in the county of New London and State of Connecticut, have invented certain new and useful Improvements in Automobile-Signals, of which the following is a specification.

My invention relates to new and useful improvements in signaling devices and more particularly direction signals for use upon motor vehicles, the primary object of my invention consisting in the provision of a manually operable signal mechanism by means of which a signal indicating an intent to turn in either direction may be displayed both at the front and rear of the vehicle.

A still further object of my invention resides in the provision of a supplemental signal at the rear of the vehicle which is also manually operable and which may be exposed to indicate intention upon the part of the driver to stop the vehicle.

A still further object that I have in view is to mount all of the signals upon a common supporting member which extends longitudinally of the vehicle and which is free for turning movement in order that the signals carried by it may be swung into and out of active position.

In this connection another object which I have in view is the arrangement of means for normally holding the signal supporting member in a certain position and for automatically returning the member to such position as soon as a signal operating pedal or lever has been released.

A still further object of my invention consists in constructing the signals proper in such a manner that they may be illumed and therefore employed at night.

With these and other objects in view my invention will be more fully described, illustrated in the accompanying drawings and then specifically pointed out in the claims which are attached to and form a part of this application.

Figure 1 is a front elevation of a conventional form of motor vehicle showing my signal applied thereto;

Fig. 2 is a transverse vertical sectional view through the vehicle illustrating the method of mounting the signal supporting means and also the arrangement of the operating pedal;

Fig. 3 is a plan view of the signal supporting member and signals;

Fig. 4 is a perspective view of the structure shown in Fig. 3;

Fig. 5 is a fragmentary perspective view of one of the brackets for the signal supporting member;

Fig. 6 is a longitudinal sectional view taken through one of the signals proper;

Fig. 7 is a front elevation of the structure shown in Fig. 6;

Fig. 8 is a sectional view taken on the line 8—8 of Fig. 7 looking in the direction of the arrows;

Fig. 9 is an elevation of the supplemental signal employed;

Fig. 10 is a sectional view taken on the line 10—10 of Fig. 9;

Fig. 11 is a diagrammatic view of a wiring system which may be employed with my signal.

In order to insure a clear and accurate understanding of my invention I have illustrated it in connection with a motor vehicle 10 having the front axle 11, rear axle 12, and side frame members 13 supporting the floor 14. Supporting brackets 15 have their ends secured to opposite portions of the frame members 13 by bolts 16 or other suitable fastening devices and the intermediate portions of these brackets project downwardly below the level of the axles of the vehicle and in alinement with each other and centrally of the vehicle. The intermediate portions of these brackets are shaped to provide half bearings 17 which coöperate with half bearing members 18 connected by bolts 19 to provide bearings for a tubular signal supporting member or rock shaft 20 which is preferably in the form of a metallic pipe of such length as to project slightly beyond the front and rear axles of the vehicle and which is free for turning movement in the bearings.

This supporting member intermediate its length is provided with a flattened seat 21 to receive a cross bar 22 which is bolted to the member 20 or otherwise secured and which projects at right angles to this member. Springs 23 connect the ends of this bar with fixed portions of the vehicle, such as the floor 14, and consequently coöperate to hold the signal supporting member 20 in a certain predetermined position and to return it to such position if turned to any other position. This bar at either side of the signal supporting member 20 is provided at its front and rear edges with upwardly directed ears 24 which journal reduced terminals of pivot heads 25 which consequently extend parallel to the member 20. Each of these pivot heads carries a rod 26 which projects through the floor of the vehicle, and which at its free end, is provided with a pedal 27. Obviously the signal supporting member 20 may be turned in either direction by pressure exerted against one or the other of the pedals and will be returned to normal position as soon as such pressure is removed.

The ends of the tubular supporting member 20 are externally threaded to receive caps 28 to which the signals proper are attached. Two coöperating signal devices 29 are attached to each cap and project radially from the cap and at right angles to each other, as best indicated in Figs. 1 and 4 of the drawings. Each signal device includes a casing 30 preferably having the configuration of an arrow and open at its front. That wall of the casing forming the butt of the arrow is provided with a projecting arm 31 which is riveted or otherwise secured as shown at 32 to one arm of an L-shaped bracket 33, the opposite arm of which is secured to the cap 28 by bolts or screws 34. A hinged closure 35 is provided for each casing 30 and each closure includes an open channeled frame 36 inclosing and supporting a closure proper 37 of glass or other suitable transparent material, preferably of a distinctive color, such as red. Spring clips 38 serve to normally hold the closures in position as shown in Fig. 7. The back wall of each casing is provided with an opening surrounded by a flange or collar 39 in which may be secured an electric light bulb receiving socket 40 in order that the signal device may be lighted at night. The wires from these sockets are preferably run into openings 41 adjacent the ends of the tubular supporting member 20 and along this member to its intermediate portion and through an opening 42 formed in the member from which they may be led to any suitable source of current and controlling switches.

In addition to the above described signal mechanism the cap 28 at the rear of the supporting member 20 carries an additional or supplemental signal device 43 best shown in Figs. 3, 9 and 10 of the drawings. This device includes a substantially rectangular casing 44 secured to the end of the cap by bolts or other fastening devices 45 and having an inner transparent closure 46 including a channeled frame 47 and glass 48. This glass 48 has inscribed upon it a suitable warning such as the word "Stop", as shown in Fig. 9, and the entire inner closure is normally hidden from view by an outer closure 49 hinged to the casing, as shown at 50, to hang down over the inner closure or to be swung upwardly to expose the signal. The end of the cap 28 is formed with an opening to receive an electric light bulb socket 51 in order that the signal may be illuminated at night.

At spaced intervals clamps 52 are secured about the signal supporting member 20 and each of these clamps has a projecting arm 53 terminating in a bearing 54. These clamps are so arranged that the bearings 54 are in alinement with each other to receive a reciprocally mounted rod 55, one end of which projects through an ear 56 formed upon the outer closure of the signal 43. This end of the rod 55 is threaded to receive nuts 57 engageable against opposite faces of the ear which is slotted for the passage of the rod. It will therefore be seen that reciprocation of the rod will act to raise and lower the outer closure of the signal 43. A hand lever 58 passes freely through an opening in the floor 14 and is pivoted at its lower end to the rod 55 adjacent one of the bearings 54. A spring 59 surrounding the rod 55 and connected at one end to one of the bearings 54 and engaging at its other end about the pivotal connection of the rod and lever, serves to normally hold the rod in forward position to keep the outer closure or cover 49 shut. This connection of lever and rod 55 does not in any way interfere with turning movement of the signal supporting member 20 and the lever may at any time be operated to force the rod 55 rearwardly and open the closure 49 to expose the stop signal.

Obviously the supply of current to the lights may be controlled in any desired manner. For instance, all of the signal lights may be included in a common circuit with a suitable source of current and a single switch may be employed for opening the circuit during the day-time and closing it at night.

On the other hand, as a means for conserving current, a system, such as that shown in Fig. 11, may be employed in which the lights 60 and 61 are the lights in the two signal casings at the front of the vehicle, the lights 62 and 63 are the lights in the corresponding signal casings at the rear of the vehicle and the light 64 is the light in the supplemental signal casing 43. In this system a three-point switch 65 including the swinging switch blade 66 and the contacts 67, 68 and 69, selectively engageable by the blade is employed. A wire 70 connects one pole of a battery 71 or other suitable source of current supply with the switch blade, while wires 72 and 73 connect the contacts 67 and 69 with the lights 60 and 61 and a wire 74 connects the contact 68 with the light 64. Wires 75 and 76 connect the lights 60 and 61 to the lights 62 and 63, respectively, and wires 77, 78 and 79 connect the lights 62, 63 and 64 to the other pole of the battery. As will be readily appreciated from this diagram, the signal lights at the right or at the left at both the front and rear may be selectively lighted or the supplemental signal light may be lighted as desired. With this system therefore only such signal lights will be lighted as are necessary to the giving of the desired signal and they will be lighted only when a signal is being given.

In operation for the sake of simplicity, however, I will assume that all of the lights are lighted as my signal device is capable of operating in that manner. The normal position of the signals at both the front and rear of the vehicle is that shown in Fig. 1 for the front and Fig. 9 for the rear, the outer closure of the additional signal device 43 being in lowered position. Under these circumstances the front signals point upwardly at an angle of 45° to the horizontal and so indicate that the driver has no intent of turning. Any time the driver wishes he may by pressing against one or the other of the foot pedals partially turn the signal supporting member 20 in one direction or the other to swing each pair of signals so that one of the signal arms will point in the direction in which he intends to turn while the other will point in a vertical direction. The stop signals may be displayed at any time by swinging the hand lever 58 to raise the outer hinged closure 49 of the signal 43. Obviously as soon as the pedal 27 which has been depressed is released the springs 23 will return the signals to normal position and the supplemental signal will have its closure swung to active or lowered position as soon as the lever 58 is released through the action of the spring 59.

Although I have illustrated and described my invention in all of its details, it will of course be understood that I do not wish to be limited to the specific features illustrated and described, but reserve the right to make any changes which may fall within the scope of the appended claims. For instance, the tubular signal supporting member 20 may be located near the side of the vehicle instead of beneath the center if desired. Furthermore, the hand lever 58 may be replaced by a shorter lever projecting only a few inches through the floor of the car and operable by the foot of the driver.

Having thus described the invention, what is claimed as new is:

1. In direction signals for vehicles, a rock shaft arranged to extend longitudinally of the vehicle to project beyond opposite ends thereof, caps fitted upon the ends of said shaft, and signals connected to and carried by the said caps to swing with the shaft and arranged at the front and rear of the vehicle, the caps being removable for displacing the said signals.

2. In a direction signal, oscillatory supporting means adapted to support a right and left hand signal to swing therewith, a signal device mounted upon one extremity of the said means, a shutter normally hiding such signal device, and means for swinging the shutter to inactive position and mounted upon the said first mentioned means to oscillate therewith.

3. In a direction signal, oscillatory supporting means adapted to support a right and left hand signal to swing therewith, a signal device mounted upon one extremity of the said means, a shutter normally hiding such signal device, and means for swinging the shutter to inactive position and mounted upon the said first mentioned means to oscillate therewith, the said last mentioned means including bearings carried by the said first mentioned means, a rod reciprocally mounted in the said bearings and operatively engaged with the shutter, and means for reciprocating the said rod.

In testimony whereof I affix my signature.

WILLIAM J. ROSE. [L. S.]